Patented July 2, 1940

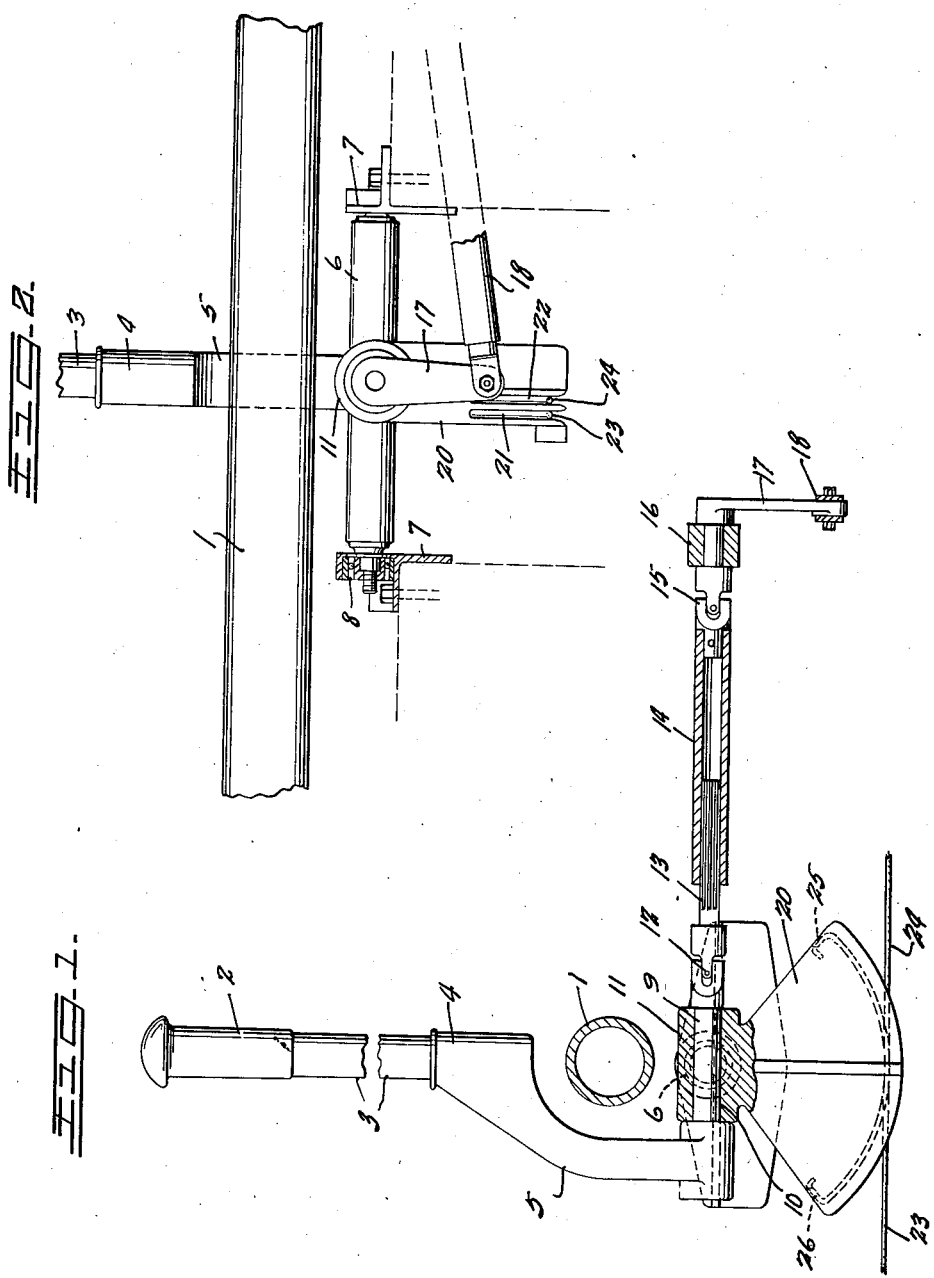

2,206,473

UNITED STATES PATENT OFFICE 2,206,473

CONTROL COLUMN FOR AIRPLANES

Herbert L. Bowers and Robert A. Wolf, Kenmore, N. Y., assignors to Bell Aircraft Corporation, Buffalo, N. Y., a corporation of New York Application December 30, 1938, Serial No. 248,638

6 Claims. (Cl. 244—83)

This invention relates to control columns for airplanes, and more particularly has reference to a control column for use where a shaft, particularly a longitudinal shaft, would normally intersect such a column. The invention finds particular application in an airplane where the pilot's seat is intermediate the power plant and the propeller, for instance in a tractor-type plane where the power plant is to the rear of the pilot.

In such a tractor-type plane, it is of course desirable to run the drive shaft along the transverse center of the plane. Inasmuch as the pilot's seat and control column are normally in the same vertical plane, it is obvious that special provision must be made to permit operation of the control column without interference with the power shaft which would normally intersect the column. It will also be appreciated that it is essential that such provision shall not sacrifice strength or dependability, and it is desirable to make such provisions with a minimum of added expense.

It is an object of this invention to provide such a column, and to accomplish the same our invention in general embraces a column which is offset in the vicinity of the power shaft and sufficiently spaced therefrom to permit of free universal movement. More particularly, the column is pivoted for fore and aft movement on a member, which member, in turn, is mounted for rotation axially of the plane. By means of suitable connections the pivot pin of the column actuates the elevators, while the rotation of the member on which the column is pivoted effects a movement of the ailerons.

In the drawing, in which corresponding numerals refer to the same parts:

Figure 1 is a rear view, partly in elevation and partly in section, of a control column constructed in accordance with our invention.

Figure 2 is a side view, in elevation, partly broken away of the device shown in Figure 1.

Referring more particularly to Figure 1, the numeral 1 indicates a power shaft for transmitting power from an engine to a propeller. As mentioned above, this invention is particularly applicable to a tractor-type plane in which the motor is located to the rear of the pilot and which, therefore, requires a relatively long power shaft which passes through the cabin. It will be noted that with the normal type of control column, the power shaft 1 would be intersected by such column.

In our novel column, a handle or grip 2 is provided as well as the stick portion 3. However, instead of this stick portion 3 extending to the point of pivot, we propose to seat the stick in a socket 4, provided at the top of an offset member 5. It will be noted that the offset member 5 is bent a sufficient distance to one side of the power shaft 1 to provide the necessary clearance with the shaft.

Referring to Figure 2, it can be seen that a cylindrical support member 6 is provided and rotatably supported in brackets 7 by ball bearings 8. Also, it can be seen that the support member 6 is parallel to the power shaft 1 and is disposed therebelow.

As best shown in Figure 1, the offset member 5 has attached thereto at its lower end a shaft 9 that extends through a transverse aperture 10 formed in a boss 11 disposed at right angles to the support member 6 and integral therewith. The shaft 9 carries a universal connection 12. The connection 12 is attached to a splined shaft 13 that is fitted into a splined tube 14. The tube 14 is provided at its opposite end with a universal connection 15, and a bearing 16 is disposed between the connection 15 and a crank arm 17. Pivotally attached to the crank arm 17 is an elevator operating rod 18.

It is believed apparent from the foregoing that fore and aft movement of the control column will actuate the elevator surfaces of the airplane through the above described parts.

Integrally formed with the boss 11 and depending therefrom is a segment 20. The segment is formed with grooves 21 and 22 around its periphery, and cables 23 and 24 are trained in the grooves 21 and 22, respectively, and are attached to the segment, as indicated at 25 and 26. The cables 23 and 24 control the ailerons and obviously when the control column is moved in a transverse direction, the ailerons can be actuated. When the control stick is manipulated to effect lateral control of the plane, the splined rod and tube 13 and 14, respectively, will of course prevent movement of the elevator surfaces.

In view of the foregoing, it is believed obvious that we have provided a control column that is capable of fore and aft and transverse movement without impeding in any way the operation of the power shaft. Moreover, the control consists of relatively few essential working parts and is simple in both construction and operation.

While we have shown and described the preferred embodiment of our invention, we wish it to be understood that we do not confine ourselves to the precise details of construction herein set forth by way of illustration, as it is apparent that many changes and variations may be made therein, by those skilled in the art, without departing from the spirit of the invention, or exceeding the scope of the appended claims.

We claim:

1. In an airplane construction embodying a power shaft and an elevator control shaft extending longitudinally of the plane, a control column located in substantially the vertical plane of said shaft, comprising a movable base member, said base member having an offset portion extending around the power shaft and spaced therefrom a sufficient distance to permit free movement of the control column without contact with the shaft, a rotatable support for said base member, a hollow boss associated with and at right angles to said support, and a shaft attached to the offset portion and extending through the hollow boss, said shaft being associated with the elevator control rod whereby fore and aft movement of the base member will be transmitted to the elevator surfaces.

2. In an airplane construction embodying a power shaft and an elevator control shaft extending longitudinally of the plane, a control column located in substantially the vertical plane of said shaft comprising a grip portion and a base member, said base member having an offset portion extending around the power shaft and spaced therefrom a sufficient distance to permit free movement of the control column without contact with the shaft, a rotatable support for said base member, a hollow boss integral with and at right angles to said support, and a shaft attached to the offset portion and extending through said hollow boss, said shaft being associated with the elevator control rod whereby fore and aft movement of the base member will be transmitted to the elevator surfaces.

3. In an airplane construction embodying a power shaft and an elevator control shaft extending longitudinally of the plane, a control column located in substantially the vertical plane of said shaft comprising a base member having an offset portion extending around the power shaft and spaced therefrom a sufficient distance to permit free movement of the control column without contact with the shaft, a rotatable support for said base member parallel with and located beneath said power shaft, a hollow boss integral with and at right angles to said support, a shaft attached to the offset portion and extending through the hollow boss, said shaft being associated with the elevator control rod whereby fore and aft movement of the base member will be transmitted to the elevator surfaces, a segment integral with said boss and depending therefrom, and aileron control cables connected to said segment whereby transverse movement of the base member will actuate the ailerons.

4. In an airplane, a control column comprising a control stick having an offset base portion, a rotatable support for said base portion, a hollow boss associated with and at right angles to said support, a rotatable shaft rigidly attached to the offset base and extending through the hollow boss.

5. In an airplane construction embodying a power shaft and an elevator control shaft, a control column located in substantially the vertical plane of said shaft, comprising a movable base member, said base member having an offset portion extending around the power shaft and spaced therefrom a sufficient distance to permit free movement of the control column without contact with the shaft, a rotatable support for said base member, a hollow boss associated with and at right angles to said support, a shaft attached to the offset portion and extending through the hollow boss, a splined tube operatively connected with the elevator control rod, and a splined shaft fitted into and operatively connecting the tube to the shaft attached to the offset portion, whereby fore and aft movement of the base member will be transmitted to the elevator surfaces.

6. In an airplane construction embodying a power shaft and an elevator control shaft extending longitudinally of the plane, a control column located in substantially the vertical plane of said shaft comprising a base member having an offset portion extending around the power shaft and spaced therefrom a sufficient distance to permit free movement of the control column without contact with the shaft, a rotatable support for said base member parallel with and located beneath said power shaft, a hollow boss integral with and at right angles to said support, a shaft attached to the offset portion and extending through the hollow boss, a splined tube operatively connected with the elevator control rod, a splined shaft fitted into and operatively connecting the tube to the shaft attached to the offset portion, whereby fore and aft movement of the base member will be transmitted to the elevator surfaces, a grooved segment integral with said boss and depending therefrom, and aileron control cables associated with said groove whereby transverse movement of the base member will actuate the ailerons.

HERBERT L. BOWERS.
ROBERT A. WOLF.